United States Patent [19]

Buchanan, Jr. et al.

[11] Patent Number: 4,768,716
[45] Date of Patent: Sep. 6, 1988

[54] VEHICLE SPEED SENSITIVE WINDSHIELD WASHER CONTROL

[75] Inventors: Harry C. Buchanan, Jr., Spring Valley; Donald E. Graham; Susan L. Via, both of Dayton, all of Ohio

[73] Assignee: General Motors Corporation, Detroit, Mich.

[21] Appl. No.: 940,453

[22] Filed: Dec. 11, 1986

[51] Int. Cl.$^4$ .............................................. B05B 1/10
[52] U.S. Cl. ............................. 239/284.1; 15/250.2; 137/624.15; 239/101; 239/156
[58] Field of Search .................... 239/284, 284.1, 101, 239/102, 156, 157; 137/624.15, 826; 347/34; 15/250.12, 250.2, 250.01

[56] References Cited

U.S. PATENT DOCUMENTS

| | | |
|---|---|---|
| 2,797,131 | 6/1957 | Parkes . |
| 3,089,204 | 5/1963 | Fingeroot et al. . |
| 3,657,626 | 4/1972 | Rouvre et al. ................ 15/250.12 |
| 4,247,045 | 1/1981 | Mitchell et al. .................. 239/156 |
| 4,520,961 | 6/1985 | Hueber . |
| 4,618,096 | 10/1986 | Kondo et al. . |

Primary Examiner—Andres Kashnikow
Assistant Examiner—C. Trainor
Attorney, Agent, or Firm—Robert M. Sigler

[57] ABSTRACT

A windshield washer control for a vehicle is responsive to vehicle speed to vary the speed of an electric motor driven pump so as to vary the pump pressure with vehicle speed and thus counteract the downward dislocating effect, increasing with vehicle speed, of air rushing over the windshield, whereby the cleaning fluid is applied to a predetermined target area of the windshield regardless of varying vehicle speed. In addition, the pump may be activated for a time varying inversely with vehicle speed to counteract the variation of volume flow with varying pump pressure and thus cause a substantially constant volume of cleaning fluid to be applied to the windshield for each activation of the pump.

3 Claims, 1 Drawing Sheet

VEHICLE SPEED SENSITIVE WINDSHIELD WASHER CONTROL

BACKGROUND OF THE INVENTION

This invention relates to controls for windshield washers and particularly to such controls which use an electric pump to deliver a cleaning fluid to the windshield through a nozzle. Such a pump generally generates a nominally constant pressure in the fluid to force it through the nozzle at a certain nominal velocity, the nozzle directing the fluid at a particular target area of the windshield. This may be demonstrated by the path 15 shown in FIG. 1. However, the fluid, once free of the nozzle, is subject to the force of air moving across the vehicle windshield. This air, at high vehicle speeds, changes the trajectory of the fluid, thereby dislocating it from its intended path and forcing it to first contact the windshield in a lower area than the area to which it is projected at low vehicle speeds, as seen in the example of path 15' in FIG. 1. On the other hand, if the nozzle is directed to place the cleaning fluid on the windshield in the target area at high vehicle speeds, at low vehicle speeds it tends to project it higher on the windshield as in path 15" of FIG. 1 or, in extreme cases, completely over the windshield onto the vehicle roof when the vehicle is standing still. Thus, it is difficult to design a vehicle windshield washer system which places the cleaning fluid on the target area of the windshield at all vehicle speeds.

Many drivers have some experience with this problem; but the prior art has had little to say about it. The most typical solution has been similar to that shown in U.S. Pat. No. 3,089,204 to Fingeroot et al, issued May 14, 1963, which recognizes the problem and proposes a special nozzle design which breaks a fluid stream into a fine mist spray which is designed to spread over a wider area. Presumably, if the nozzle is designed to spread the cleaning fluid over a wider area of the windshield, at least some will be applied to the target area of the windshield at any vehicle speed. This is true to some extent. However, the distribution of cleaning fluid across the windshield still varies with vehicle speed, since the fine droplets are also subject to dislocation by the air stream rushing over the windshield.

U.S. Pat. No. 2,797,131 to Parkes, issued June 25, 1957, shows a windshield washer mechanism with a nozzle which is rocked up and down during the application of cleaning fluid to the windshield; however, the purpose is to cover a wider area of the windshield. Although the apparatus shown would inherently assist in applying some cleaning fluid to the windshield over a wider range of vehicle speeds, there is no recognition or teaching of this fact. In addition, this approach would be a cumbersome and expensive approach to the problem discussed herein.

SUMMARY OF THE INVENTION

The invention resides in a windshield washer control for a vehicle having an electric motor driven washer pump and a supply of cleaning fluid adapted to be propelled by the pump, when the pump is activated, through a nozzle at a predetermined area of the vehicle windshield, the cleaning fluid after leaving the nozzle being subject to the dislocating effect of air moving across the windshield with vehicle motion to be forced to a lower portion of the windshield than the predetermined area, the degree of dislocation increasing with vehicle speed. It comprises, in combination, means effective to generate a vehicle speed signal and means responsive to the vehicle speed signal to vary the speed of the electric motor driven pump so as to vary the pump pressure with vehicle speed and thus counteract the dislocating effect, whereby the cleaning fluid is propelled to the predetermined area regardless of vehicle speed.

In addition, it may further comprise timer controlled activation means for the pump, the timer controlled activation means being responsive to the vehicle speed signal to vary the duration of activation of the pump inversely with vehicle speed to counteract the variation of volume flow with varying pump pressure and thus cause a substantially constant volume of cleaning fluid to be applied to the windshield for each activation of the pump, regardless of vehicle speed. Further details and advantages of the invention will be apparent in the accompanying drawings and following description of a preferred embodiment.

DSCRIPTION OF THE PREFERRED EMBODIMENT

Figure 1:
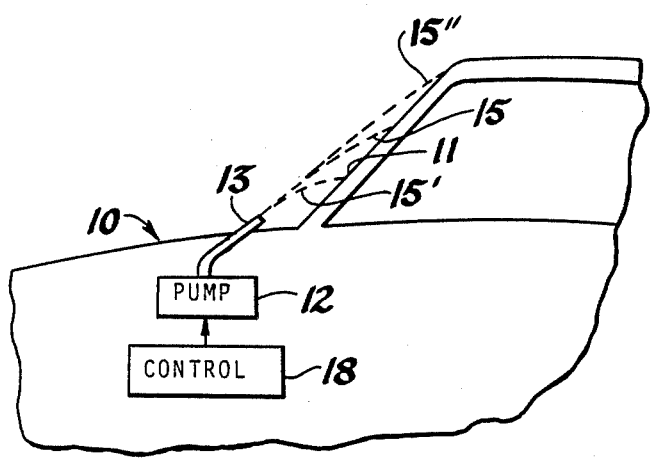
FIG. 1 is a partial view of a vehicle with a windshield washer.

Referring to FIG. 1, a motor vehicle 10 has a windshield 11 with windshield wipers, not shown. A windshield washer is used in conjunction with the wipers to apply a cleaning fluid to windshield 11 and wipe the windshield clean. The washer comprises an electric motor driven pump 12 effective to propel a cleaning fluid from a reservoir, not shown, through a nozzle 13 under a pressure sufficient to direct the fluid to a target area on windshield 11 which has been predetermined as optimal for cleaning. The fluid path may, for example, correspond to the middle path 15 shown in FIG. 1. A washer control 18 controls the activation of the electric motor in pump 12 with regard to fluid pressure and at least partially with respect to duration of activation so as to control the area of application and the volume of fluid applied.

Figure 2:
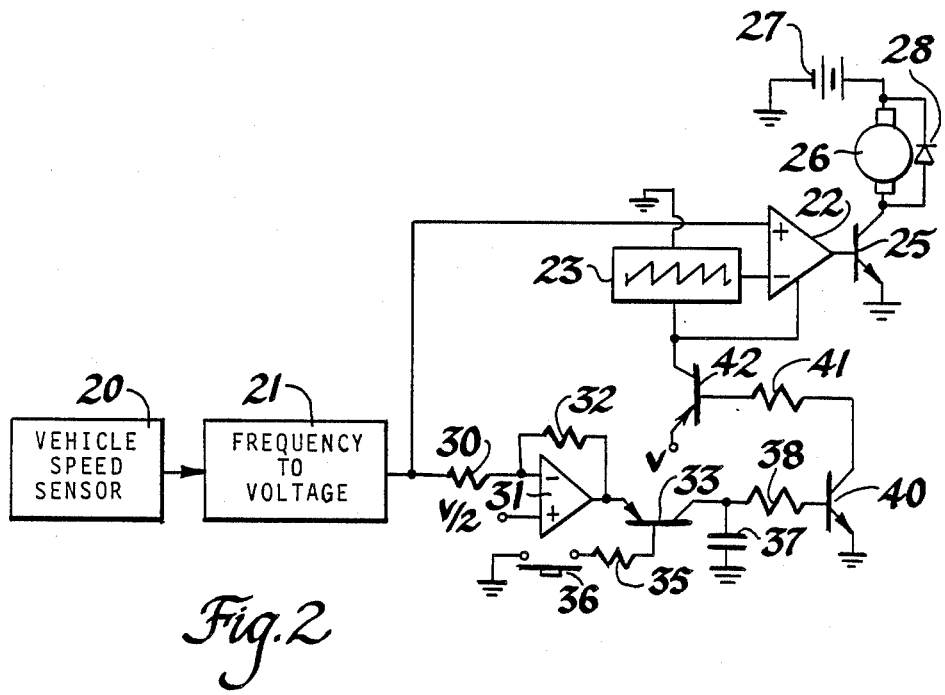
FIG. 2 is a circuit and block diagram of a control according to the invention for use on the vehicle of FIG. 1.

Washer control 18 is shown in detail in FIG. 2. A vehicle speed sensor 20 generates an electrical pulse signal having a frequency proportional to vehicle speed. Such vehicle speed sensors are well known and may take the form of a toothed or vaned rotary member driven at a speed proportional to the driving wheels and a suitable pickup of the magnetic or other appropriate type. Such sensors are commonly used in vehicles with electronic speedometers.

Vehicle speed sensor 20 provides its signal to a frequency to voltage converter 21, which generates an output voltage proportional to the frequency of the input signal. Such devices or circuits are known in the prior art and need not be described in detail in this specification. The output voltage, which varies directly in proportion to vehicle speed, is provided to the non-inverting input of a comparator 22. The inverting input of comparator 22 sees the output of a sawtooth voltage generator 23. The output of comparator 22 switches high for a proportion of the sawtooth cycle which increases with vehicle speed and is connected to the base of an NPN transistor 25 having a grounded emitter and a collector connected through the armature of a DC motor 26 to a source of electric power at voltage V, symbolized by battery 27. Transistor 25 switches the armature current of motor 26 at a constant frequency and a duty cycle increasing with vehicle speed so that the speed of motor 26 similarly increases with vehicle speed. The frequency of sawtooth generator 23 is sufficiently high that the pulses are averaged by the motor inductance, but not so high as to create RFI problems: a typical frequency is 20 KHz. Motor 26 is paralleled by a freewheeling diode 28 in the normal manner.

If the essentially linear relationship of motor 26 speed to vehicle speed produced by this circuitry is not optimal, a processing circuit of any known type may be introduced between the output of comparator 22 and transistor 25 to change the relationship to one that is optimal. It may be, for example, that the desired relationship is somewhere closer to a motor 26 speed that varies with the square of vehicle speed. Those skilled in the art will know appropriate voltage conversion circuits; and this invention includes, but is not restricted to, systems including them.

Motor 26 drives a centrifugal pump in the windshield washer system to generate a pressure that increases with pump motor speed and therefore vehicle speed. Thus, as vehicle speed increases and greater pressure is needed to counteract the effect of air pushing the cleaning fluid down into the lower part of the windshield, the greater pressure is supplied. However, the increased pressure at high vehicle speeds also provides increased volume of cleaning fluid at the higher speeds; but it is desired to have an approximately constant volume of cleaning fluid at all vehicle speeds. If the washer system is of the demand type, the vehicle operator may make up for the lesser volume at lower vehicle speeds by operating the washer button for a longer period. However, in a programmed washer system, the volume adjustment must be programmed. In addition, even in a demand system, it would be desirable to assist the operator in evening the amount of fluid. The remainder of FIG. 2 shows additional circuit means for evening the volume over the vehicle speed range.

The output of frequency to voltage converter 21 is also provided through a resistor 30 to the inverting input of an operational amplifier (op amp) 31 provided with negative feedback through a resistor 32 and a reference voltage V/2 at its non-inverting input. The output of op amp 31 is connected to the emitter of a PNP transistor 33 having a base connected through a resistor 35 and activating switch 36 to ground. The collector of transistor 33 is connected through a capacitor 37 to ground and through a resistor 38 to the base of an NPN transistor 40. Transistor 33 is biased to charge capacitor 37 at a rate dependent on the output of frequency to voltage converter 21 through op amp 31 during its activation by the closure of switch 36. Thus, for equivalent durations of switch 36 activation, the charge on capacitor 37 will vary inversely with vehicle speed. If desired, switch 36 may be triggered by a one shot in response to vehicle operator activation of a separate washer switch so that the duration will be a predetermined constant. However, if switch 36 is activated by the driver directly, operator control of cleaning fluid volume is allowed along with automatic application duration adjustment with vehicle speed to ensure constant volume for equivalent operator action across the vehicle speed range, as will be described.

With the release and opening of switch 36, capacitor 37 begins discharging through resistor 38 and transistor 40. Transistor 40 remains turned on during this discharge for a period proportional to the time needed for discharge, which is proportional to the beginning charge and therefore inversely proportional to vehicle speed. Transistor 40 has a grounded emitter and a collector connected through a resistor 41 to the base of a PNP transistor 42. Transistor 42 has an emitter connected to voltage V and a collector connected to supply operating power to sawtooth generator 23 and comparator 22. The duty cycle signal is provided to transistor 25 and motor 26, therefore, only while transistor 42, and thus transistor 40, is turned on. The period of operation of motor 26 is thus inversely proportional to vehicle speed for similar activations of switch 36. Since the pump pressure generated by motor 26 is proportional to vehicle speed, the volume of cleaning fluid delivered per application is maintained constant across the total vehicle speed range without additional operator adjustment.

The embodiments of the invention in which an exclusive property or privilege is claimd are defined as follows:

1. A windshield washer control for a vehicle having an electric motor driven washer pump and a supply of cleaning fluid adapted to be propelled by the pump, when the pump is activated, through a nozzle at a predetermined area of the vehicle windshield, the cleaning fluid after leaving the nozzle being subject to the dislocating effect of air moving across the windshield with vehicle motion to be forced to a lower portion of the windshield than the predetermined area, the degree of dislocation increasing with vehicle speed, the control comprising, in combination:

means effective to generate a vehicle speed signal;

means responsive to the vehicle speed signal to vary the speed of the electric motor driven pump so as to vary the pump pressure with vehicle speed and thus counteract the dislocating effect, whereby the cleaning fluid is propelled to the predetermined area regardless of vehicle speed; and timer controlled activation means for the pump, the timer controlled activation means being responsive to the vehicle speed signal to vary the duration of activation of the pump inversely with vehicle speed to counteract the variation of volume flow with varying pump pressure and thus cause a substantially constant volume of cleaning fluid to be applied to the windshield for each activation of the pump.

2. The windshield washer control of claim 1 in which the vehicle speed signal is in the form of a voltage varying with vehicle speed and the timer controlled activation means comprises, in combination:

a capacitor;

capacitor charge switch control means;

current source means responsive to the activation of the capacitor charge switch control means to charge the capacitor with a current varying inversely with vehicle speed;

a discharge resistor for the capacitor; and motor control switch means responsive to the voltage on the capacitor to activate the electric motor while the charge on the capacitor exceeds a predetermined charge, whereby the duration of pump activation varies inversely with the maximum charge on the capacitor and thus with vehicle speed.

3. A windshield washer control for a vehicle having an electric motor driven washer pump and a supply of cleaning fluid adapted to be propelled by the pump, when the pump is activated, through a nozzle at a predetermined area of the vehicle windshield, the cleaning fluid after leaving the nozzle being subject to the dislocating effect of air moving across the windshield with vehicle motion to be forced to a lower portion of the windshield than the predetermined area, the degree of dislocation increasing with vehicle speed, the control comprising, in combination:

means effective to generate a vehicle speed signal in the form of a voltage varying with vehicle speed;

means for generating a sawtooth voltage wave;

means for comparing the sawtooth voltage wave to the voltage varying with vehicle speed and generating an output rectangular voltage wave of constant peak amplitude; the duty cycle of the rectangular voltage wave varying with vehicle speed;

semiconductor switch means responsive to the rectangular voltage wave to control the armature current of the electric motor driving the pump and thus vary pump pressure with vehicle speed to counteract the dislocating effect, whereby the cleaning fluid is propelled to the predetermined area regardless of vehicle speed;

a capacitor;

capacitor charge switch control means;

current source means responsive to the activation of the capacitor charge switch control means to charge the capacitor with a current varying inversely with vehicle speed;

a discharge resistor for the capacitor; and motor control switch means responsive to the voltage on the capacitor to activate the electric motor while the charge on the capacitor exceeds a predetermined charge, whereby the duration of pump activation varies inversely with the maximum charge on the capacitor and thus with vehicle speed.

* * * * *